(12) United States Patent
Fukuhara et al.

(10) Patent No.: US 12,012,528 B2
(45) Date of Patent: Jun. 18, 2024

(54) RESIN MATERIAL, AQUEOUS SOLUTION, AND ADHESIVE

(71) Applicant: KURARAY CO., LTD., Okayama (JP)

(72) Inventors: Tadahito Fukuhara, Ibaraki (JP); Tatsuya Tanida, Frankfurt am Main (DE)

(73) Assignee: KURARAY CO., LTD., Okayama (JP)

(*) Notice: Subject to any disclaimer, the term of this patent is extended or adjusted under 35 U.S.C. 154(b) by 563 days.

(21) Appl. No.: 17/054,838

(22) PCT Filed: May 24, 2019

(86) PCT No.: PCT/JP2019/020609
§ 371 (c)(1),
(2) Date: Nov. 12, 2020

(87) PCT Pub. No.: WO2019/225731
PCT Pub. Date: Nov. 28, 2019

(65) Prior Publication Data
US 2021/0179900 A1 Jun. 17, 2021

(30) Foreign Application Priority Data
May 25, 2018 (JP) .................. 2018-100753

(51) Int. Cl.
*C09J 129/04* (2006.01)
*C08F 8/12* (2006.01)
(Continued)

(52) U.S. Cl.
CPC .......... *C09J 129/04* (2013.01); *C08F 210/02* (2013.01); *C08F 216/06* (2013.01);
(Continued)

(58) Field of Classification Search
CPC .......... C09J 129/04; C08F 216/06; C08F 8/12; C08F 218/08; C08F 210/02; C08K 5/098; C08K 5/01; C08L 29/04; C08L 9/00
See application file for complete search history.

(56) References Cited

U.S. PATENT DOCUMENTS 6,472,470 B1 10/2002 Fujiwara et al.
2009/0227718 A1 9/2009 Tanimoto et al.

FOREIGN PATENT DOCUMENTS

JP 2000-017224 A 1/2000
JP 2000-309607 A 11/2000
(Continued)

OTHER PUBLICATIONS

Hayashi et al. Multilayer structure, container using same, and manufacturing method thereof, JP2012245767A, Original and translation attached (Year: 2012).*
(Continued)

*Primary Examiner* — Marc S Zimmer
*Assistant Examiner* — Surbhi M Du
(74) *Attorney, Agent, or Firm* — Morgan, Lewis & Bockius LLP

(57) ABSTRACT

The present invention provides a resin material that comprises an ethylene-modified vinyl alcohol polymer as a main component, and that excels in hue, water solubility, and aqueous-solution viscosity stability. The present invention also provides an aqueous solution and an adhesive comprising such a resin material. The present invention relates to a resin material comprising an ethylene-modified vinyl alcohol polymer and sodium acetate, wherein:

the ethylene-modified vinyl alcohol polymer has an ethylene unit content of 1 mol % or more and less than 15 mol %, a viscosity-average degree of polymerization of 200 or more and less than 3,000, and a degree of saponification of 80 mol % or more and less than 99.9

(Continued)

mol %, and comprises 0.0005 mol % or more and 0.10 mol % or less of a propyl group at one end of the polymer, and
the sodium acetate content is 0.05 mass % or more and less than 2 mass %.

20 Claims, 1 Drawing Sheet

(51) Int. Cl.
    *C08F 210/02*     (2006.01)
    *C08F 216/06*     (2006.01)
    *C08F 218/08*     (2006.01)
    *C08K 5/098*     (2006.01)
    *C08L 29/04*     (2006.01)
    *C08K 3/34*     (2006.01)

(52) U.S. Cl.
    CPC ............ *C08F 218/08* (2013.01); *C08K 5/098* (2013.01); *C08L 29/04* (2013.01); *C08F 8/12* (2013.01); *C08K 3/346* (2013.01)

(56) References Cited

FOREIGN PATENT DOCUMENTS

| | | | |
|---|---|---|---|
| JP | 2001-172593 | A | 6/2001 |
| JP | 2001-205935 | A | 7/2001 |
| JP | 2009-084316 | A | 4/2009 |
| JP | 2012-245767 | A | 12/2012 |
| WO | 2005/121241 | A1 | 12/2005 |
| WO | 2014/192773 | A1 | 12/2014 |

OTHER PUBLICATIONS

International Search Report issued in corresponding International Patent Application No. PCT/JP2019/020609 dated Jun. 25, 2019.
Extended European Search Report issued in corresponding European Patent Application No. 19807352.0 dated Feb. 4, 2022.

* cited by examiner

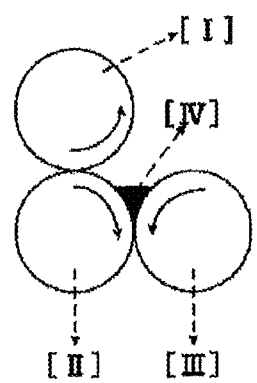

RESIN MATERIAL, AQUEOUS SOLUTION, AND ADHESIVE

TECHNICAL FIELD

The present invention relates to a resin material that comprises an ethylene-modified vinyl alcohol polymer as a main component, and that excels in hue, water solubility, and aqueous-solution viscosity stability. The present invention also relates to an aqueous solution and an adhesive comprising such a resin material.

BACKGROUND ART

Polyvinyl alcohol (hereinafter, also referred to simply as "PVA") is a known water-soluble synthetic polymer, and is used in a wide range of applications, including a raw material of synthetic fiber Vinylon, a paper processing agent, a textile processing agent, an adhesive, a stabilizer for emulsion polymerization and suspension polymerization, a binder for inorganic products, and a film.

An important consideration in using PVA is the white hue, particularly in film applications, where transparency is needed. However, a film produced from an aqueous solution of PVA used for film fabrication tends to have variation in its properties when the PVA aqueous solution undergoes large viscosity changes.

Patent Literature 1 attempts to overcome this problem with an ethylene-vinyl alcohol copolymer having an ethylene unit content of 2 to 19 mol %, a degree of polymerization of 200 to 2,000, a degree of saponification of 80 to 99.99 mol %, and a total carboxyl group and lactone ring content of 0.02 to 0.4 mol %.

However, the ethylene-vinyl alcohol copolymer proposed in this related art document cannot be said as being sufficient in terms of hue and aqueous-solution viscosity stability.

In adhesive uses, there is a strong demand for high-speed coatability on paper, in order to reduce cost and improve productivity. Patent Literature 2 describes an adhesive using an ethylene-modified vinyl alcohol polymer. However, the high-speed coatability of the adhesive disclosed in this related art document is not satisfactory for industrial applications.

CITATION LIST

Patent Literature

Patent Literature 1: JP 2000-309607 A
Patent Literature 2: JP 2001-172593 A

SUMMARY OF INVENTION

Technical Problem

The present invention has been made under these circumstances, and it is an object of the present invention to provide a resin material that comprises an ethylene-modified vinyl alcohol polymer as a main component, and that excels in hue, water solubility, and aqueous-solution viscosity stability. Another object of the present invention is to provide an aqueous solution and an adhesive comprising such a resin material.

Solution to Problem

The present invention has solved the problems discussed above by providing a resin material comprising an ethylene-modified vinyl alcohol polymer and a specific amount of sodium acetate, wherein the ethylene-modified vinyl alcohol polymer is an ethylene-modified vinyl alcohol polymer having specific ranges of ethylene unit content, viscosity-average degree of polymerization, and degree of saponification, and containing a specific amount of a propyl group at one end of the polymer.

Specifically, the present invention includes the following.

[1] A resin material comprising an ethylene-modified vinyl alcohol polymer and sodium acetate, wherein:
the ethylene-modified vinyl alcohol polymer has an ethylene unit content of 1 mol % or more and less than 15 mol %, a viscosity-average degree of polymerization of 200 or more and less than 3,000, and a degree of saponification of 80 mol % or more and less than 99.9 mol %, and comprises 0.0005 mol % or more and 0.10 mol % or less of a propyl group at one end of the polymer, and
the sodium acetate content is 0.05 mass % or more and less than 2 mass %.

[2] The resin material of [1], wherein the resin material has a solubility of 90% or more after being stirred at 90° C. and 300 rpm for 5 hours with 90 parts by mass of water relative to 10 parts by mass of the resin material.

[3] The resin material of [1] or [2], wherein the ethylene-modified vinyl alcohol polymer has a 1,2-glycol linkage content of 1.2 mol % or more and less than 2.0 mol %.

[4] The resin material of any one of [1] to [3], wherein the ethylene-modified vinyl alcohol polymer has an ethylene unit content of 1 mol % or more and less than 5 mol %.

[5] The resin material of any one of [1] to [4], wherein the resin material further comprises a compound having a conjugated double bond and a molecular weight of 1,000 or less, the compound being contained in an amount of 0.000001 to 0.01 parts by mass relative to 100 parts by mass of the ethylene-modified vinyl alcohol polymer.

[6] The resin material of [5], wherein the compound having a conjugated double bond and a molecular weight of 1,000 or less comprises a compound having conjugated aliphatic double bonds, and/or a compound having an aliphatic double bond in conjugation with an aromatic ring.

[7] The resin material of [6], wherein the compound having a conjugated double bond and a molecular weight of 1,000 or less comprises a compound having conjugated aliphatic double bonds, and the compound having conjugated aliphatic double bonds is at least one selected from the group consisting of a conjugated diene compound, a conjugated triene compound, and a conjugated polyene compound.

[8] The resin material of [7], wherein the compound having conjugated aliphatic double bonds is a conjugated diene compound.

[9] The resin material of any one of [5] to [8], wherein the compound having a conjugated double bond and a molecular weight of 1,000 or less comprises a compound having an aliphatic double bond in conjugation with an aromatic ring.

[10] The resin material of any one of [1] to [9], wherein the compound having a conjugated double bond and a molecular weight of 1,000 or less has a molecular weight of 500 or less.

[11] The resin material of any one of [1] to [10], wherein the ethylene-modified vinyl alcohol polymer comprises 0.001 mol % or more and less than 0.08 mol % of a propyl group at one end of the polymer.

[12] The resin material of any one of [1] to [11], wherein the sodium acetate content is 0.1 mass % or more and less than 1.5 mass %.

[13] A powder comprising the resin material of any one of [1] to [12] and having a yellow index of 13.0 or less.

[14] An aqueous solution comprising the resin material of any one of [1] to [12].

[15] An adhesive using the aqueous solution of [14].

Advantageous Effects of Invention

The present invention can provide a resin material that comprises an ethylene-modified vinyl alcohol polymer as a main component, and that excels in hue, water solubility, and aqueous-solution viscosity stability. The present invention can also provide an aqueous solution of such a resin material, and an adhesive comprising such an aqueous solution and having superior high-speed coatability.

BRIEF DESCRIPTION OF DRAWINGS

FIG. 1 is a schematic diagram showing three rolls used for the evaluation of adhesives in Examples.

DESCRIPTION OF EMBODIMENTS

Resin Material

A resin material of the present invention comprises an ethylene-modified vinyl alcohol polymer (hereinafter, also referred to simply as "ethylene-modified PVA") and sodium acetate, wherein:

the ethylene-modified vinyl alcohol polymer has an ethylene unit content of 1 mol % or more and less than 15 mol %, a viscosity-average degree of polymerization of 200 or more and less than 3,000, and a degree of saponification of 80 mol % or more and less than 99.9 mol %, and comprises 0.0005 mol % or more and 0.10 mol % or less of a propyl group at one end of the polymer, and the sodium acetate content is 0.05 mass % or more and less than 2 mass %.

A resin material of the present invention comprises the ethylene-modified PVA as a main component.

As used herein, "main component" means a content of 50 mass % or more in the resin material. The content of the ethylene-modified PVA in a resin material of the present invention is preferably 70 mass % or more, more preferably 80 mass % or more, even more preferably 90 mass % or more, particularly preferably 95 mass % or more, most preferably 98 mass % or more.

With the main-component ethylene-modified PVA of the resin material containing a specific amount of a propyl group at one end of the polymer, an aqueous solution of the resin material can exhibit superior viscosity stability. Though the reason for this observation remains somewhat unclear, it is speculated that the propyl group in the ethylene-modified PVA enables the ethylene-modified PVA to control the association state of its chain in an aqueous solution dissolving the resin material, enabling the aqueous solution of the resin material to exhibit superior viscosity stability. With the sodium acetate content of the resin material confined in the specific range, it is also possible to inhibit deterioration during resin material production, and to control the association state of the ethylene-modified PVA in an aqueous solution, producing a resin material that excels in hue and aqueous-solution viscosity stability. As used herein, "hue" of a resin material means a yellow index (YI) measured and calculated for a resin material powder using a color meter (SM-T-H1, manufactured by Suga Test Instruments Co., Ltd.) according to JIS Z 8722:2009 and JIS K 7373:2006, after removing particles of sizes smaller than 100 μm and larger than 1,000 μm using a sieve (opening: 100 μm, 1,000 μm), as will be described in the EXAMPLES section below.

Ethylene-Modified PVA

It is important that the ethylene-modified PVA used in the present invention have an ethylene unit content of 1 mol % or more and less than 15 mol %. The ethylene unit content is preferably 1 mol % or more and less than 10 mol %, more preferably 1 mol % or more and less than 8 mol %, even more preferably 1 mol % or more and less than 5 mol %. With an ethylene unit content of less than 1 mol %, the aqueous-solution viscosity stability decreases, whereas an ethylene unit content of 15 mol % or more leads to decrease of water solubility. The ethylene unit content is measured in the manner described in the EXAMPLES section below.

It is important that the ethylene-modified PVA used in the present invention have a viscosity-average degree of polymerization of 200 or more and less than 3,000. The viscosity-average degree of polymerization is preferably 400 or more and less than 2,800, more preferably 450 or more and less than 2,500. A viscosity-average degree of polymerization of less than 200 poses difficulties in production, and makes the hue insufficient, whereas the aqueous-solution viscosity stability becomes insufficient with a viscosity-average degree of polymerization of 3,000 or more. The viscosity-average degree of polymerization is a measured value according to JIS K 6726:1994. Specifically, for a PVA with a degree of saponification of less than 99.5 mol %, the PVA was saponified until a degree of saponification of 99.5 mol % or more was achieved, and the viscosity-average degree of polymerization (P) was determined using the limiting viscosity [η] (liter/g) measured in water at 30° C., using the following formula.

$$P=([\eta]\times 10^4/8.29)^{(1/0.62)}$$

It is important that the ethylene-modified PVA used in the present invention have a degree of saponification of 80 mol % or more and less than 99.9 mol %. The degree of saponification is preferably 90 mol % or more and less than 99.9 mol %. A degree of saponification of less than 80 mol % leads to decrease of solubility in water. A degree of saponification of 99.9 mol % or more poses difficulties in producing ethylene-modified PVA. The degree of saponification is a measured value according to JIS K 6726:1994.

It is important that the ethylene-modified PVA used in the present invention contain 0.0005 mol % or more and 0.10 mol % or less of a propyl group at one end of the polymer. In view of providing even higher aqueous-solution viscosity stability, the propyl-group content is preferably 0.001 mol % or more and less than 0.08 mol %, more preferably 0.005 mol % or more and less than 0.05 mol %. A propyl-group content of less than 0.0005 mol % leads to an insufficient hue and insufficient aqueous-solution viscosity stability. A propyl-group content of more than 0.10 mol % leads to insufficient aqueous-solution viscosity stability.

An alkyl group having fewer carbon atoms than a propyl group is not easily introducible to the ethylene-modified PVA, and produces an insufficient hue. An alkyl group having more carbon atoms than a propyl group leads to insufficient aqueous-solution viscosity stability.

The propyl-group content of the ethylene-modified PVA is determined from, for example, a $^1$H-NMR spectrum of an ethylene-modified vinyl ester polymer, a precursor or a re-acetified product of the ethylene-modified PVA. Specifically, a sample vinyl ester polymer is reprecipitated and purified at least three times with a mixed solution of n-hexane and acetone, and dried under reduced pressure at 80° C. for 3 days to produce an ethylene-modified vinyl ester polymer to be analyzed. For analysis, the ethylene-modified vinyl ester polymer is dissolved in DMSO-$d_6$, and measured by $^1$H-NMR (500 MHz) spectroscopy at 80° C. The propyl-group content was calculated from the peak attributed to the proton on the methine in the main chain of vinyl acetate (integral value R: 4.7 to 5.2 ppm), and the peak attributed to the protons on the methyl of the propyl group (integral value S: 0.7 to 1.0 ppm), using the following formula.

Propyl-group content (mol %)=100×(S/3)/R

The ethylene-modified PVA used in the present invention has a 1,2-glycol linkage content of preferably 1.2 mol % or more and less than 2.0 mol %, more preferably 1.4 mol % or more and less than 1.9 mol %. A 1,2-glycol linkage content of 1.2 mol % or more improves productivity, and is industrially advantageous, in addition to producing even higher aqueous-solution viscosity stability. A 1,2-glycol linkage content of less than 2.0 mol % improves productivity, and is industrially advantageous, in addition to producing a more desirable hue with a reduced shade of yellow. The 1,2-glycol linkage content is measured in the manner described in the EXAMPLES section below.

Sodium Acetate

It is important that the sodium acetate content in a resin material of the present invention be 0.05 mass % or more and less than 2 mass %. In view of providing a more desirable hue and even higher aqueous-solution viscosity stability, the sodium acetate content is preferably 0.1 mass % or more and less than 1.5 mass %, more preferably 0.15 mass % or more and less than 1.0 mass %. A sodium acetate content of less than 0.05 mass % leads to decrease of aqueous-solution viscosity stability, whereas a sodium acetate content of 2 mass % or more impairs the hue. The sodium acetate content was determined using the solution conductivity method described in JIS K 6726:1994. As used herein, "sodium acetate content" means a fraction of sodium acetate with respect to the total mass of ethylene-modified PVA and sodium acetate.

Compound Having Conjugated Double Bond and Molecular Weight of 1,000 or Less

In view of improving high-speed coatability and waterproof adhesion, it is preferable that the resin material of the present invention further comprise a compound having a conjugated double bond and a molecular weight of 1,000 or less. Though the mechanism by which high-speed coatability improves remains unclear, it is speculated that the conjugated double bond moiety interacts with the ethylene unit of ethylene-modified PVA in polar solvent, and moderately inhibits intermolecular interaction between ethylene-modified PVA molecules.

In the present invention, the compound having a conjugated double bond and a molecular weight of 1,000 or less is a compound having conjugated aliphatic double bonds, or a compound having an aliphatic double bond in conjugation with an aromatic ring. The former is preferred in view of more effectively improving high-speed coatability and waterproof adhesion. The molecular weight is preferably 800 or less, more preferably 500 or less. The compound having a conjugated double bond and a molecular weight of 1,000 or less may be used alone, or two or more thereof may be used in combination.

The compound having conjugated aliphatic double bonds is a compound having a structure with alternately occurring carbon-carbon double bonds and carbon-carbon single bonds, and containing two or more conjugated carbon-carbon double bonds. Specific examples of such compounds include conjugated diene compounds having a conjugated structure with two alternating carbon-carbon double bonds separated by a single carbon-carbon single bond, conjugated triene compounds (for example, 2,4,6-octatriene) having a conjugated structure with three alternating carbon-carbon double bonds with two intervening carbon-carbon single bonds, and conjugated polyene compounds having a conjugated structure in which more than three carbon-carbon double bonds and carbon-carbon single bonds alternate. Conjugated diene compounds are preferred in view of more effectively improving high-speed coatability and waterproof adhesion. In the present invention, the compound having a conjugated double bond and a molecular weight of 1,000 or less may be a compound having more than one set of independently occurring conjugated double bonds per molecule. Examples of such compounds include compounds having three conjugated trienes within the molecule, for example, such as wood oils.

The compound having a conjugated double bond and a molecular weight of 1,000 or less may have functional groups other than conjugated double bonds. Examples of such other functional groups include a carboxy group and salts thereof, a hydroxyl group, an ester group, a carbonyl group, an ether group, an amino group, a dialkylamino group, an imino group, an amide group, a cyano group, a diazo group, a nitro group, a mercapto group, a sulfone group, a sulfoxide group, a sulfide group, a thiol group, a sulfonic acid group and salts thereof, a phosphoric acid group and salts thereof, a polar group such as halogen atoms, and a nonpolar group such as phenyl. In view of more effectively improving high-speed coatability and waterproof adhesion, preferred as other functional groups is a polar group, more preferably a carboxy group and salts thereof, and a hydroxyl group. The functional groups other than conjugated double bonds may be directly attached to the carbon atoms of the conjugated double bonds, or may be attached away from the conjugated double bonds. The multiple bonds in functional groups other than conjugated double bonds may occur at positions that enable conjugation with the conjugated double bonds. For example, the compound having a conjugated double bond and a molecular weight of 1,000 or less may be 1-phenyl-1,3-butadiene having a phenyl group, or sorbic acid having a carboxy group. The compound having a conjugated double bond and a molecular weight of 1,000 or less may have unconjugated double bonds or unconjugated triple bonds.

Specific examples of the compound having a conjugated double bond and a molecular weight of 1,000 or less include compounds having conjugated aliphatic double bonds, such as 2,3-dimethyl-1,3-butadiene, 4-methyl-1,3-pentadiene, 1-phenyl-1,3-butadiene, sorbic acid, and myrcene; and compounds having an aliphatic double bond in conjugation with an aromatic ring, such as 2,4-diphenyl-4-methyl-1-pentene, an α-methylstyrene polymer, and 1,3-diphenyl-1-butene.

The content of the compound having a conjugated double bond and a molecular weight of 1,000 or less is preferably 0.000001 to 0.01 parts by mass relative to 100 parts by mass of the ethylene-modified PVA. The content is more preferably 0.000002 parts by mass or more, even more preferably 0.000003 parts by mass or more. The content is more preferably 0.0075 parts by mass or less, even more preferably 0.005 parts by mass or less, particularly preferably 0.0025 parts by mass or less.

In the present invention, the method of adding the compound having a conjugated double bond and a molecular weight of 1,000 or less is not particularly limited. For example, the following methods may be used.

1) The compound having a conjugated double bond and a molecular weight of 1,000 or less is added to the ethylene-modified vinyl ester polymer before saponification.

2) The compound is added while saponifying the ethylene-modified vinyl ester polymer.

3) A solution containing the compound is sprayed onto the resin material.

4) The resin material is impregnated with a solution containing the compound, and dried.

5) An aqueous solution containing the resin material and the compound is prepared, and dried.

6) An aqueous solution containing the resin material and the compound is prepared, and used for various applications.

Of these methods, method 6) is preferred in view of easy adjustments of the content of the compound.

A resin material of the present invention has a solubility of preferably 90% or more, more preferably 95% or more, after being stirred at 90° C. and 300 rpm for 5 hours with 90 parts by mass of water relative to 10 parts by mass of the resin material. The viscosity stability of the aqueous solution tends to decrease when the solubility is less than 90%.

A powder comprising a resin material of the present invention has a yellow index (hereinafter, also referred to simply as "YI") of preferably 13.0 or less, more preferably 11.0 or less, even more preferably 10.0 or less, particularly preferably 9.0 or less. In this specification, YI is a value measured and calculated according to JIS Z 8722:2009 and JIS K 7373:2006.

Method of Production of Resin Material

A preferred method of production of a resin material of the present invention is a method in which, in producing the ethylene-modified PVA by a process that includes a polymerization step of obtaining an ethylene-modified vinyl ester polymer through a reaction of ethylene and vinyl acetate, and a saponification step of saponifying the ethylene-modified vinyl ester polymer, the reaction between ethylene and vinyl acetate in the polymerization step is carried out in the presence of a propyl group-containing initiator and a propyl group-containing chain transfer agent, and the saponification step uses a sodium atom-containing catalyst with a specific amount of water in the raw material solution of saponification. By using a propyl group-containing initiator and a propyl group-containing chain transfer agent in the polymerization step, a specific amount of propyl group can be efficiently introduced to one end of the ethylene-modified PVA. By using a sodium atom-containing catalyst with a specific amount of water in the raw material solution of saponification, it is possible to control the sodium acetate content of the resin material obtained.

Polymerization Step

The ethylene-modified PVA can be produced by polymerizing ethylene and vinyl acetate using a known method such as bulk polymerization, solution polymerization, suspension polymerization, emulsion polymerization, or dispersion polymerization. In view of enhancing the effects of the present invention, solution polymerization is preferred that polymerizes ethylene and vinyl acetate with a lower alcohol. The lower alcohol is not particularly limited, and is preferably an alcohol having at most three carbon atoms, such as methanol, ethanol, and propanol, isopropanol, of which methanol is more preferred. Polymerization may use any of the batch, semi-batch, and continuous procedures.

For copolymerization of ethylene and vinyl acetate, monomers other than ethylene and vinyl acetate may be copolymerized to such an extent that it is not against the intent and purpose of the present invention. Examples of such monomers include:

α-olefins such as propylene, n-butene, and isobutylene;
(meth)acrylic acid and salts thereof;
(meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate;
acrylamide compounds such as (meth)acrylamide, N-methyl(meth)acrylamide, N-ethyl(meth)acrylamide, N,N-dimethyl(meth)acrylamide, diacetone(meth)acrylamide, (meth)acrylamide propanesulfonic acid and salts thereof, (meth)acrylamide propyldimethylamine and salts or quaternary salts thereof, and N-methylol (meth)acrylamide and derivatives thereof;
vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;
nitriles such as acrylonitrile and methacrylonitrile;
vinyl halides such as vinyl chloride and vinyl fluoride;
vinylidene halides such as vinylidene chloride and vinylidene fluoride;
allyl compounds such as allyl acetate and allyl chloride;
unsaturated dicarboxylic acids such as maleic acid, itaconic acid, fumaric acid, and salts or esters thereof;
vinyl silyl compounds such as vinyltrimethoxysilane; and
isopropenyl acetate.

These may be used alone, or two or more thereof may be used in combination. Monomers other than ethylene and vinyl acetate are copolymerized in an amount of typically 10 mol % or less. As used herein, "(meth)acryl" is a collective term that refers to "methacryl" and "acryl".

The method used to introduce a propyl group is not particularly limited. Preferably, a propyl group is introduced by reacting ethylene and vinyl acetate in the presence of a propyl group-containing initiator and a propyl group-containing chain transfer agent in the polymerization step. By using a propyl group-containing initiator and a propyl group-containing chain transfer agent, it is possible to efficiently produce an ethylene-modified PVA containing a specific amount of propyl group at one end of the polymer.

Examples of the propyl group-containing initiator include n-propyl peroxydicarbonate, and 1,1'-propane-1-nitrile. In order to achieve the desired propyl-group content, the propyl group-containing initiator is used in an amount of preferably 0.000125 mass % or more and 0.25 mass % or less, more preferably 0.0003 mass % or more and 0.2 mass % or less, even more preferably 0.0005 mass % or more and 0.15 mass % or less relative to vinyl acetate.

Examples of the propyl-group containing chain transfer agent include propanethiol, and propyl aldehyde. In order to achieve the desired propyl-group content, the concentration of the propyl group-containing chain transfer agent in the system is preferably 0.0001 mass % or more and 0.005 mass % or less, more preferably 0.0002 mass % or more and 0.004 mass % or less, even more preferably 0.0003 mass % or more and 0.003 mass % or less relative to vinyl acetate.

The polymerization temperature is not particularly limited, and is preferably 0 to 180° C., more preferably 20 to 160° C., even more preferably 30 to 150° C. For polymerizations carried out at or below the boiling point of the solvent used in the polymerization step, polymerization may be achieved by vacuum boiling polymerization that takes place with a boiling solvent under reduced pressure, or atmospheric non-boiling polymerization that takes place under ordinary pressure without boiling the solvent. For polymerizations carried out at or above the boiling point of the solvent used in the polymerization step, polymerization may be achieved by pressurized non-boiling polymerization that takes place under applied pressure without boiling the solvent, or pressurized boiling polymerization that takes place with a boiling solvent under applied pressure.

The pressure of the ethylene in a polymerization reaction vessel in the polymerization step is not particularly limited, and is preferably 0.01 to 0.9 MPa, more preferably 0.05 to 0.7 MPa, even more preferably 0.1 to 0.65 MPa. The polymerization conversion rate of vinyl acetate at the exit of the polymerization reaction vessel is not particularly limited, and is preferably 10 to 90%, more preferably 15 to 85%.

Removal Step

Preferably, the polymerization step is followed by a removal step that removes the vinyl acetate remaining in the polymer solution containing the ethylene-modified vinyl ester polymer produced. The removal step enables more efficient removal of vinyl acetate, one of the factors responsible for coloring, making it possible to produce an even more desirable hue in the resin material obtained. The method for removing the residual vinyl acetate is not particularly limited. For example, the residual vinyl acetate can be removed by:
(i) heating;
(ii) continuously adding methanol while applying heat;
(iii) continuously blowing methanol vapor into the polymer solution; or
(iv) continuously blowing methanol vapor into the polymer solution while applying heat.

The residual vinyl acetate may be removed while continuously adding the polymer solution containing the ethylene-modified vinyl ester polymer into the reaction vessel subjected to the removal step, or after the polymer solution containing the ethylene-modified vinyl ester polymer is added to the reaction vessel.

In the removal step, the average residence time of the polymer solution containing the ethylene-modified vinyl ester polymer is preferably at least 1 hour and at most 5 hours. When the average residence time is shorter than 1 hour, it may not be possible to remove the residual vinyl acetate in sufficient amounts, and the hue of the resulting ethylene-modified PVA tends to deteriorate. With an average residence time of longer than 5 hours, the hue of the resulting ethylene-modified PVA tends to deteriorate because of excessive heat.

The temperature of the heat applied to the apparatus used for removal in the removal step is not particularly limited. The temperature in the removal step is typically 10 to 120° C., preferably 50 to 90° C., a temperature range near the boiling points of methanol and vinyl acetate.

The amount of vinyl acetate that remains in the ethylene-modified vinyl ester polymer-containing polymer solution after the removal step (a fraction of vinyl acetate relative to the total mass of the ethylene-modified vinyl ester polymer and vinyl acetate) is preferably less than 1.0 mass %, more preferably less than 0.5 mass %. When the amount of residual vinyl acetate is more than 1.0 mass %, the hue of the resulting resin material tends to deteriorate.

Saponification Step

A raw material solution to be saponified can be prepared by adding a small amount of water to the ethylene-modified vinyl ester polymer-containing polymer solution obtained after the polymerization step or after the removal step optionally performed following the polymerization step. Preferably, water is added in such an amount that the raw material solution to be saponified has a water content (hereinafter, also referred to simply as "system water content") of 0.1 mass % or more and 3.0 mass % or less, more preferably 0.3 mass % or more and 2.5 mass % or less. With the system water content of the raw material solution to be saponified falling in these ranges, it becomes easier to adjust the sodium acetate content of the resin material obtained.

The saponification of the ethylene-modified vinyl ester polymer in the saponification step can be achieved by alcoholysis or hydrolysis of the raw material solution to be saponified, using a catalyst having a sodium atom. Examples of the catalyst having a sodium atom include sodium hydroxide, and sodium methoxide. Examples of the solvent used in the saponification step include alcohols such as methanol and ethanol; esters such as methyl acetate and ethyl acetate; ketones such as acetone and methyl ethyl ketone; and aromatic hydrocarbons such as benzene and toluene. These may be used alone, or two or more thereof may be used in combination. Preferred for simplicity is a saponification reaction carried out in the presence of sodium hydroxide using methanol or a mixed solution of methanol and methyl acetate as a solvent. Preferably, the catalyst is used in an amount of 0.001 to 0.5, more preferably 0.002 to 0.4, even more preferably 0.004 to 0.3 in terms of a mole ratio relative to the vinyl acetate unit in the ethylene-modified vinyl ester polymer.

Washing Step

Optionally, the saponification step may be followed by a washing step. The solvent used for washing may be, for example, an alcohol such as methanol or ethanol, or an ester such as methyl acetate or ethyl acetate. The washing step is not particularly limited to specific conditions. Preferably, washing is carried out in a temperature range between 20° C. and the boiling point of the solvent for about 30 minutes to about 10 hours.

Aqueous Solution

A preferred form of the present invention is an aqueous solution containing the resin material. The aqueous solution has various uses, including, for example, an adhesive, a dispersion stabilizer, a coating agent, a binder, a paper processing agent, a viscosity adjuster, a raw material of a molded product such as a film, and a raw resin material for post reaction. A more preferred form of the present invention is an adhesive containing the aqueous solution, as will be described later.

The content of components other than water and organic solvent (solid content) in the aqueous solution is preferably 1 to 50 mass %. The content is more preferably 3 mass % or more, even more preferably 5 mass % or more. The content is more preferably 45 mass % or less, even more preferably 40 mass % or less.

Preferably, the aqueous solution further comprises an inorganic filler. The inorganic filler may be one used for the adhesive described below. The inorganic filler content is preferably 20 to 500 parts by mass relative to 100 parts by mass of the ethylene-modified PVA. The inorganic filler content is more preferably 50 parts by mass or more. The inorganic filler content is more preferably 300 parts by mass or less.

In order to impart flexibility to the adhesive layer formed when the aqueous solution is used as an antifreezing agent or an adhesive, the aqueous solution may contain a water-soluble organic solvent, for example, such as an alcohol (e.g., methanol, ethylene glycol, and glycerin), or cellosolve. The organic solvent content is preferably 100 parts by mass or less, more preferably 50 parts by mass or less, even more preferably 10 parts by mass or less relative to 100 parts by mass of water.

Adhesive

A preferred form of the present invention is an adhesive containing the aqueous solution. In view of improving the flowability and bond strength of the adhesive, it is preferable that the adhesive further comprise an inorganic filler. The inorganic filler is not particularly limited, and may be appropriately selected according to factors such as the types of adherends and coaters, and the required performance. Examples of the inorganic filler include clays (such as kaolinite, halloysite, pyrophyllite, and sericite), heavy, light, or surface-treated calcium carbonate, aluminum hydroxide, aluminum oxide, plasters, talc, and titanium oxide. Preferred are clays. The inorganic filler may be used alone, or two or more thereof may be used in combination. In view of obtaining a homogenous slurry solution with no aggregation or sedimentation of inorganic filler in the aqueous solution, the average particle diameter of the inorganic filler is preferably 10 μm or less, more preferably 8 μm or less, even more preferably 5 μm or less. The average particle diameter of inorganic filler can be measured using the laser-diffraction particle size distribution measurement device SALD-2300 manufactured by Shimadzu Corporation.

The inorganic filler content is preferably 20 to 500 parts by mass relative to 100 parts by mass of the ethylene-modified PVA. An inorganic filler content of less than 20 parts by mass tends to delay the development of initial bond strength. The inorganic filler content is more preferably 50 parts by mass or more. An inorganic filler content of more than 500 parts by mass tends to impair the flowability of the adhesive, or facilitate sedimentation of inorganic filler in the aqueous solution, in addition to decreasing the bond strength. The inorganic filler content is more preferably 300 parts by mass or less.

The adhesive may comprise additives other than the resin material containing ethylene-modified PVA as a main component, in addition to the inorganic filler and water, provided that such additives do not interfere with the effects of the present invention. Examples of such other additives include:
 dispersants for inorganic materials such as metal salts of phosphoric acid compounds (e.g., sodium polyphosphate, sodium hexametaphosphate), and water glass;
 polyacrylic acid and salts thereof;
 sodium alginate;
 anionic polymer compounds such as an α-olefin-maleic anhydride copolymer, and metal salts thereof; and
 nonionic surfactants such as ethylene oxide adducts of higher alcohols, and copolymers of ethylene oxide and propylene oxide.

The flowability of the adhesive improves by adding these additives. Optionally, the adhesive may also comprise additives such as carboxymethyl cellulose, polyethylene oxide, an antifoaming agent, a preservative, a mildewcide, a color pigment, a deodorant, and a fragrance. For further improvement of bond strength, the adhesive may comprise water-soluble boron compounds such as boric acid, borax, and boric acid esters of polyalcohols such as glycerin and ethylene glycol. Examples of yet other additives include: natural glues such as starch, casein, gelatin, guar gum, gum arabic, and sodium alginate; processed natural glues such as CMC, oxidized starch, and methyl cellulose; synthetic resin emulsions such as acryl emulsion, polyvinyl acetate emulsion, ethylene-vinyl acetate copolymer emulsion, and SBR latex; and various rubber latexes. A known PVA also may be used as an additive, provided that it is not detrimental to the effects of the present invention. The total content of other additives is preferably 100 parts by mass or less, more preferably 50 parts by mass or less, even more preferably 25 parts by mass or less, particularly preferably 10 parts by mass or less relative to 100 parts by mass of the ethylene-modified PVA.

The method of production of the adhesive is not particularly limited, and the adhesive may be produced by using, for example, a method by which a resin material containing the ethylene-modified PVA as a main component is dissolved in water. Specifically, the adhesive can be obtained by adding the resin material to water, optionally with the compound having a conjugated double bond and a molecular weight of 1,000 or less, and the inorganic filler, and dissolving the resin material. The production of adhesive may be a batch or a continuous process. In the case of adding the compound having a conjugated double bond and a molecular weight of 1,000 or less, and the inorganic filler or other additives, (i) a mixture of the resin material, the compound having a conjugated double bond and a molecular weight of 1,000 or less, and the inorganic filler may be added to water after mixing these components, or (ii) the resin material, the compound having a conjugated double bond and a molecular weight of 1,000 or less, and the inorganic filler may be added to water one after another. It is preferable that water be stirred while adding these components to water. The resin material is dissolved by heating a slurry obtained by adding the resin material to water, optionally with the compound having a conjugated double bond and a molecular weight of 1,000 or less, and the inorganic filler. Here, heat may be applied using any heating method, including heating that directly sends vapor, and indirect heating that uses a jacketed reactor.

The viscosity of an adhesive of the present invention may be adjusted according to intended use. Typically, the viscosity is 100 to 8,000 mPa·s as measured with a B-type viscometer (30 rpm, 20° C.).

An adhesive of the present invention can be evenly cast because of reduced jumping and reduced bubble trapping, and has superior high-speed coatability with reduced stringiness. This makes an adhesive of the present invention suitable for use in known applications where PVA has traditionally been used as an adhesive. For example, an adhesive of the present invention can be suitably used as an adhesive for various types of paper such as a paperboard, a cardboard, a paper core, fusuma (sliding panels), and wall paper. A preferred form of an adhesive of the present invention is an adhesive applied to a base material.

Uses

A resin material of the present invention has various uses. The following are non-limiting examples of possible uses.

(1) Dispersants: dispersion stabilizers for pigments contained in materials such as coating materials and adhesives; dispersion stabilizers and dispersion aids for suspension polymerization of various vinyl compounds such as vinyl chloride, vinylidene chloride, styrene, (meth)acrylate, and vinyl acetate (2) Coating agents: paper coating agents, sizing agents, textile processing agents, leather finishing agents, coating materials, anti-fogging agents, metal corrosion inhibitors, gloss agents for zinc plating, and antistatic agents (3) Adhesives: adhesives, pressure sensitive adhesives, rewetting adhesives, various binders, and additives for cements and mortars (4) Emulsifiers: emulsifiers for emulsion polymerization, and post-emulsifiers for substances such as bitumen (5) Flocculants: flocculants for suspended and dissolved matter in water, and metal flocculants (6) Paper processing: paper strength enhancers, oil- and solvent-resistance imparting agents, smoothness improving agents, auxiliary agents for surface gloss improvement, sealing agents, barrier agents, lightfastness imparting agents, waterproofing agents, dispersants for dyes and color-developing agents, adhesion improving agents, and binders (7) Agriculture: agrichemical binders, agrichemical spreading agents, agricultural coating agents, soil improvers, erosion preventing agents, and agrichemical dispersants (8) Medicine and cosmetics: granulating binders, coating agents, emulsifiers, patches, binders, film formulation bases, and film-forming agents (9) Viscosity adjustments: thickeners, and rheology adjusters

(10) Films: water-soluble films, polarizing films, barrier films, textiles wrapping films, seedling protecting sheets, vegetation sheets, seed tapes, and hygroscopic films

(11) Molded items: fibers, pipes, tubes, leak-proof films, water-soluble fibers for chemical laces, and sponges

(12) Gels: medical gels, industrial gels

(13) Post-reactions: post-reactions with low-molecular organic compounds, high-molecular organic compounds, and inorganic compounds

EXAMPLES

The following describes the present invention in greater detail by way of Examples. In the following Examples and Comparative Examples, "part(s)" and "%" are "part(s) by mass" and "mass %", respectively, unless otherwise specifically stated.

Ethylene Unit Content of Ethylene-Modified PVA

The ethylene unit content of ethylene-modified PVA was determined by $^1$H-NMR analysis of an ethylene-modified vinyl ester polymer, a precursor or a re-acetified product of ethylene-modified PVA. Specifically, samples of the ethylene-modified vinyl ester polymers of Examples and Comparative Examples are reprecipitated and purified at least three times using a mixed solution of n-hexane and acetone, and dried under reduced pressure at 80° C. for 3 days to prepare ethylene-modified vinyl ester polymers to be analyzed. For analysis, the ethylene-modified vinyl ester polymers were dissolved in DMSO-$d_6$, and measured by $^1$H-NMR (500 MHz) spectroscopy at 80° C. The ethylene unit content was calculated from the peak attributed to the proton on the methine in the main chain of vinyl acetate (integral value P: 4.7 to 5.2 ppm), and the peak attributed to the protons on the methylene in the main chains of ethylene and vinyl acetate (integral value Q: 1.0 to 1.6 ppm), using the following formula.

Ethylene unit content (mol %)=100×((Q−2P)/4)/P

Viscosity-Average Degree of Polymerization of Ethylene-Modified PVA

The viscosity-average degree of polymerization of ethylene-modified PVA was measured according to JIS K 6726: 1994. Specifically, for an ethylene-modified PVA with a degree of saponification of less than 99.5 mol %, the PVA was saponified until a degree of saponification of 99.5 mol % or more was achieved, and the viscosity-average degree of polymerization (P) was determined using the limiting viscosity [η] (liter/g) measured in water at 30° C., using the following formula.

P=([η]×10$^4$/8.29)$^(1/0.62)$

Degree of Saponification of Ethylene-Modified PVA

The degree of saponification of ethylene-modified PVA was measured according to JIS K 6726:1994.

1,2-Glycol Linkage Content of Ethylene-Modified PVA

The 1,2-glycol linkage content of ethylene-modified PVA was determined from peaks observed in a $^1$H-NMR spectrum. Specifically, the ethylene-modified PVA was saponified until a degree of saponification of 99.9 mol % or more was achieved. After being thoroughly washed with methanol, the PVA was dried under reduced pressure at 90° C. for 2 days, and dissolved in DMSO-$d_6$. A sample prepared by adding a few drops of trifluoroacetic acid was then measured by $^1$H-NMR spectroscopy (500 MHz) at 80° C. The 1,2-glycol linkage content was calculated from the peak attributed to the proton on the methine of the vinyl alcohol unit occurring at 3.2 to 4.0 ppm (integral value A), and the peak attributed to the proton on the methine of one of the 1,2-glycol linkages occurring near 3.15 to 3.35 ppm (integral value B), using the following formula.

1,2-Glycol Linkage Content (mol %)=B/A×100

Content of Propyl Group at One End of Ethylene-Modified PVA

The content of the propyl group at one end of ethylene-modified PVA was determined by $^1$H-NMR analysis of an ethylene-modified vinyl ester polymer, a precursor or a re-acetified product of the ethylene-modified PVA. Specifically, a sample of the ethylene-modified vinyl ester polymer was reprecipitated and purified at least three times using a mixed solution of n-hexane and acetone, and dried under reduced pressure at 80° C. for 3 days to prepare an ethylene-modified vinyl ester polymer to be analyzed. For analysis, the ethylene-modified vinyl ester polymer was dissolved in DMSO-$d_6$, and measured by $^1$H-NMR (500 MHz) spectroscopy at 80° C. The propyl-group content was calculated from the peak attributed to the proton on the methine in the main chain of vinyl acetate (integral value R: 4.7 to 5.2 ppm), and the peak attributed to the protons on the methyl of the propyl group (integral value S: 0.7 to 1.0 ppm), using the following formula.

Propyl-group content (mol %)=100×(S/3)/R

Sodium Acetate Content of Resin Material

The content of sodium acetate in the resin material containing ethylene-modified PVA as a main component was determined according to the solution conductivity method described in JIS K 6726:1994.

Solubility of Resin Material

One-hundred grams of a 10% aqueous solution of resin material (10 g of resin material in 90 g of water) was stirred at 90° C. and 300 rpm for 5 hours, and the total amount was filtered through a 200-mesh metal sieve (equivalent to a JIS standard sieve mesh size of 75 μm; the mesh size is in compliance with the nominal opening W of JIS Z 8801-1-2006). Here, the mass of the metal sieve before filtration is a (g). The trapped material was dried at 105° C. for 3 hours, together with the sieve (the total mass of the metal sieve and the substance remaining on the sieve after drying is b (g)). The solubility (%) of the resin material was determined using the following formula.

Solubility (%)=100−100×{(b−a)/10}

Viscosity Stability of Aqueous Solution of Resin Material

One-hundred grams of the 10% aqueous solution of resin material prepared under the conditions above was left to stand at 5° C., and viscosity c of when the liquid temperature reached 5° C. was determined. The measured value of viscosity c was compared with a viscosity d determined after the aqueous solution was left to stand at 5° C. for 48 hours. The viscosity stability of the aqueous solution was then determined from the ratio (viscosity ratio) d/c. Larger d/c values indicate higher rates of viscosity increase in the aqueous solution left to stand at 5° C., meaning poor viscosity stability. Here, the viscosity (mPa·s) is a measured value obtained at a rotor speed of 60 rpm at 20° C. using a B-type viscometer BLII (manufactured by Toki Sangyo Co., Ltd.).

Hue (YI) of Resin Material

The hue of resin material was determined in terms of a yellow index (YI) of the resin material in powder form. For the measurement of yellow index, particles smaller than 100 μm and larger than 1,000 μm were removed using a sieve (opening: 100 μm, 1000 μm), and the remaining particles were measured with a color meter (SM-T-H1 manufactured by Suga Test Instruments Co., Ltd.). Here, yellow index YI is a value measured and calculated according to JIS Z 8722:2009 and JIS K 7373:2006.

The following inorganic fillers were used.
Inorganic filler 1: Kaolinite clay ASP 200, manufactured by BASF; average particle diameter 0.4 μm
Inorganic filler 2: Kaolinite clay Huber 900, manufactured by J.M. Huber; average particle diameter 0.6 μm
Inorganic filler 3: Heavy calcium carbonate Whiton P-30, manufactured by Shiraishi Kogyo Kaisha, Ltd.; average particle diameter 1.75 μm

High-Speed Coatability

Adhesives obtained in the Example and Comparative Examples below were evaluated using three rolls. FIG. 1 illustrates the three rolls used for evaluation. Each roll was adjusted to a surface temperature of 30° C. An adhesive [IV] prepared for evaluation was fed between a roll [II] and a roll [III], and a roll [I] was rotated at a surface velocity of 100 m/min. The adhesives were evaluated under the following criteria.
(1) Jumping: The adhesive was observed for any jumping of liquid droplets from between roll [I] and roll [II], and evaluated using the following criteria.
 A: No jumping of liquid droplets
 B: Jumping of a few liquid droplets
 C: Jumping of many liquid droplets
(2) Roll transferability:
 The adhesive was observed for the uniformity of its transferability to roll [I].
 A: Uniform
 B: Non-uniform
(3) Bubbling: The three rolls were rotated for 5 minutes. The adhesive [IV] was evaluated for trapping of bubbles using the mass ratio of adhesive [IV] calculated for 100 ml of the adhesive before rotation and 100 ml of the adhesive after rotation (mass after rotation/mass before rotation).
(4) Stringiness: The stringiness of the adhesive between roll [I] and roll [II] was determined by visual inspection, using the following criteria.
 A: No observable strings
 B: Observed strings

Example 1

Production of Resin Material (1)

A continuous polymerization vessel was used that was equipped with a reflux condenser, a raw material feed line, a reaction mixture extraction line, a thermometer, a nitrogen inlet, an ethylene inlet, and a stirring vane. To the continuous polymerization vessel were continuously supplied vinyl acetate, methanol, and a 1% methanol solution of initiator n-propyl peroxydicarbonate at 671 L/hr, 148 L/hr, and 1.0 L/hr, respectively, using a metering pump. The amount of n-propyl peroxydicarbonate is 0.00132 mass %/vinyl acetate. The ethylene pressure inside the continuous polymerization vessel was adjusted to 0.23 MPa. The polymer solution was continuously taken out of the continuous polymerization vessel in such a manner that the continuous polymerization vessel had a constant liquid level. The polymerization conversion rate at the exit of the continuous polymerization vessel was adjusted to be 26%. Here, propanethiol was continuously added as a chain transfer agent to achieve a system concentration of 0.00042 mass %/vinyl acetate (a percentage relative to the residual vinyl acetate in the continuously withdrawn polymer solution). The residence time in the continuous polymerization vessel is 5 hours. The temperature at the exit of the continuous polymerization vessel is 60° C. The polymer solution was taken out of the continuous polymerization vessel, and, in order to remove the residual vinyl acetate (hereinafter, also refer to simply as "VAc"), methanol vapor was introduced into the polymer solution while heating the solution at 75° C. in a hot bath. This produced a methanol solution of ethylene-modified vinyl ester polymer (hereinafter, also referred to simply as "PVAc"; 32% PVAc concentration). The residence time in the removal step is 2 hours on average, and the ethylene-modified vinyl ester polymer produced contained 0.1% residual vinyl acetate in the methanol solution. This was followed by a saponification reaction, which was carried out at 40° C. for 1 hour after adjusting the system water content to 0.5% for the saponification step, and by using sodium hydroxide as a saponification catalyst at a mole ratio of 0.012 relative to the ethylene-modified vinyl ester polymer. For washing, the polymer was immersed in methanol. After centrifugal removal of solvent and subsequent drying, a resin material (1) was obtained that contained ethylene-modified PVA as a main component, and 0.42% sodium acetate. The ethylene-modified PVA had an ethylene unit content of 2 mol %, a viscosity-average degree of polymerization of 1,700, a degree of saponification of 98.5 mol %, a 1,2-glycol linkage content of 1.6 mol %, and a propyl-group content of 0.0061 mol % for the propyl group at one end of the polymer.

The resin material (1) was measured for the solubility of the ethylene-modified PVA heated at 90° C. for 5 hours in the manner described above. The resin material (1) was also measured for aqueous-solution viscosity stability, and hue. The resin material (1) had a solubility of more than 99%, an aqueous-solution viscosity stability of 1.30, and a hue (YI) of 4.65. The results are presented in Table 2.

Examples 2 to 12 and Comparative Examples 1 to 9

Production of Resin Materials (2) to (21)

Resin materials (2) to (21) were produced in the same manner as for the resin material (1) of Example 1, except that the conditions shown in Table 1 were used with regard to the ethylene pressure, the amount of vinyl acetate, the amount of methanol, the type and amount of initiator, the type and amount of chain transfer agent, polymerization conditions such as polymerization temperature and polymerization conversion rate, conditions such as the average residence time and the water bath temperature in the residual vinyl acetate monomer removal step, and saponification conditions such as the saponification PVAc concentration, the mole ratio of sodium hydroxide relative to ethylene-modified vinyl ester polymer, and the system water content. Table 2 shows details of the resin materials (2) to (21) produced. The resin materials (2) to (21) were also evaluated for solubility, aqueous-solution viscosity stability, and hue (YI), as in Example 1. The results are presented in Table 2.

TABLE 1

| | | Polymerization conditions | | | | | | | |
|---|---|---|---|---|---|---|---|---|---|
| | | Ethylene (MPa) | Vinyl acetate (L/hr) | Methanol (L/hr) | Initiator Type | Initiator (L/hr) | Polymerization temp. (° C.) | Chain transfer agent Type | Chain transfer agent (%/system VAc) | Polymerization conversion rate (%) |
| Ex. 1 | Resin material (1) | 0.23 | 671 | 148 | NPP | 1.0 | 60 | Propanethiol | 0.00042 | 26 |
| Ex. 2 | Resin material (2) | 0.23 | 671 | 131 | NPP | 1.0 | 60 | Propanethiol | 0.00037 | 26 |
| Ex. 3 | Resin material (3) | 0.1 | 618 | 103 | NPP | 67.3 | 60 | Propanethiol | 0.00320 | 75 |
| Ex. 4 | Resin material (4) | 0.1 | 618 | 103 | NPP | 67.3 | 60 | Propanethiol | 0.00320 | 75 |
| Ex. 5 | Resin material (5) | 0.26 | 741 | 65 | NPP | 0.7 | 60 | Propanethiol | 0.00032 | 22 |
| Ex. 6 | Resin material (6) | 0.47 | 726 | 115 | NPP | 0.9 | 60 | Propanethiol | 0.00042 | 22 |
| Ex. 7 | Resin material (7) | 0.61 | 631 | 165 | NPP | 3.0 | 60 | Propanethiol | 0.00067 | 38 |
| Ex. 8 | Resin material (8) | 0.69 | 626 | 216 | NPP | 30.3 | 60 | Propanethiol | 0.00217 | 67 |
| Ex. 9 | Resin material (9) | 0.23 | 671 | 148 | NPP | 1.0 | 60 | Propanethiol | 0.00042 | 26 |
| Ex. 10 | Resin material (10) | 0.23 | 671 | 148 | NPP | 1.0 | 60 | Propanethiol | 0.00042 | 26 |
| Ex. 11 | Resin material (11) | 0.12 | 584 | 143 | NPP | 41.9 | 30 | Propanethiol | 0.00036 | 42 |
| Ex. 12 | Resin material (12) | 0.31 | 812 | 0 | NPP | 4.1 | 100 | Propanethiol | 0.00065 | 27 |
| Com. Ex. 1 | Resin material (13) | 0.23 | 671 | 148 | NPP | 1.0 | 60 | Propanethiol | 0.00042 | 26 |
| Com. Ex. 2 | Resin material (14) | — | 671 | 148 | NPP | 1.0 | 60 | Propanethiol | 0.00037 | 26 |
| Com. Ex. 3 | Resin material (15) | 0.1 | 665 | 7 | NPP | 67.3 | 60 | Propanethiol | 0.01302 | 70 |
| Com. Ex. 4 | Resin material (16) | 0.26 | 683 | 37 | NPP | 0.58 | 60 | Propanethiol | 0.00012 | 18 |
| Com. Ex. 5 | Resin material (17) | 0.23 | 641 | 195 | AMV | 2.0 | 60 | — | — | 26 |
| Com. Ex. 6 | Resin material (18) | 0.23 | 671 | 148 | NPP | 1.0 | 60 | Dodecanethiol | 0.00111 | 26 |
| Com. Ex. 7 | Resin material (19) | 0.23 | 671 | 148 | NPP | 1.0 | 60 | Propanethiol | 0.00042 | 26 |
| Com. Ex. 8 | Resin material (20) | 0.23 | 671 | 148 | AMV | 2.0 | 60 | Methanethiol | 0.00081 | 26 |
| Com. Ex. 9 | Resin material (21) | 1.17 | 583 | 197 | NPP | 30.9 | 60 | Propanethiol | 0.00122 | 57 |

| | | Vac removal step conditions | | | Saponification conditions | | |
|---|---|---|---|---|---|---|---|
| | | Water bath temp. (° C.) | Average residence time (h) | Residual VAc (%) | PVAc concentration (mass %) | NaOH (mole ratio) | System water content (%) |
| Ex. 1 | Resin material (1) | 75 | 2 | 0.1 | 32 | 0.012 | 0.5 |
| Ex. 2 | Resin material (2) | 75 | 2 | 0.1 | 32 | 0.05 | 2.0 |
| Ex. 3 | Resin material (3) | 75 | 2 | 0.1 | 45 | 0.008 | 0.5 |
| Ex. 4 | Resin material (4) | 75 | 2 | 0.1 | 45 | 0.006 | 0.5 |
| Ex. 5 | Resin material (5) | 75 | 2 | 0.1 | 25 | 0.015 | 0.5 |
| Ex. 6 | Resin material (6) | 75 | 2 | 0.1 | 30 | 0.012 | 0.5 |
| Ex. 7 | Resin material (7) | 75 | 2 | 0.1 | 40 | 0.012 | 0.5 |
| Ex. 8 | Resin material (8) | 75 | 2 | 0.1 | 45 | 0.012 | 0.5 |
| Ex. 9 | Resin material (9) | 70 | 2 | 1.9 | 32 | 0.013 | 0.5 |
| Ex. 10 | Resin material (10) | 75 | 5 | 0.1 | 32 | 0.012 | 0.5 |
| Ex. 11 | Resin material (11) | 75 | 2 | 0.1 | 32 | 0.012 | 0.5 |
| Ex. 12 | Resin material (12) | 75 | 2 | 0.1 | 32 | 0.012 | 0.5 |

TABLE 1-continued

| | | | | | | | |
|---|---|---|---|---|---|---|---|
| Com. Ex. 1 | Resin material (13) | 75 | 2 | 0.1 | 32 | 0.004 | 0.5 |
| Com. Ex. 2 | Resin material (14) | 75 | 2 | 0.1 | 32 | 0.012 | 0.5 |
| Com. Ex. 3 | Resin material (15) | 75 | 2 | 0.1 | 45 | 0.02 | 0.5 |
| Com. Ex. 4 | Resin material (16) | 75 | 2 | 0.1 | 22 | 0.02 | 0.5 |
| Com. Ex. 5 | Resin material (17) | 75 | 2 | 0.1 | 32 | 0.025 | 0.5 |
| Com. Ex. 6 | Resin material (18) | 75 | 2 | 0.1 | 32 | 0.012 | 0.5 |
| Com. Ex. 7 | Resin material (19) | 75 | 2 | 0.1 | 32 | 0.08 | 0.5 |
| Com. Ex. 8 | Resin material (20) | 75 | 2 | 0.1 | 32 | 0.012 | 0.5 |
| Com. Ex. 9 | Resin material (21) | 75 | 2 | 0.1 | 45 | 0.023 | 0.5 |

NPP: n-Propyl peroxydicarbonate; AMV: 2,2'-azobis(4-methoxy-2,4-dimethylvaleronitrile)

TABLE 2

| | | Ethylene unit content (mol %) | Degree of polymerization | 1,2-Glycol linkage content (mol %) | Propyl-group content (mol %) | Degree of saponification (mol %) | Sodium acetate content (mass %) | Evaluation | | |
|---|---|---|---|---|---|---|---|---|---|---|
| | | | | | | | | YI | Viscosity stability of 10% aqueous solution*1 | Solubility*2 (%) |
| Ex. 1 | Resin material (1) | 2 | 1700 | 1.6 | 0.0061 | 98.5 | 0.42 | 4.7 | 1.30 | 99.9< |
| Ex. 2 | Resin material (2) | 2 | 1700 | 1.6 | 0.0061 | 98.5 | 1.70 | 9.1 | 1.05 | 99.9< |
| Ex. 3 | Resin material (3) | 2 | 500 | 1.6 | 0.0663 | 88.0 | 0.28 | 5.5 | 1.01 | 99.9< |
| Ex. 4 | Resin material (4) | 2 | 500 | 1.6 | 0.0663 | 80.0 | 0.20 | 5.8 | 1.01 | 99.9< |
| Ex. 5 | Resin material (5) | 2 | 2300 | 1.6 | 0.0051 | 98.8 | 0.67 | 4.7 | 1.37 | 99.9< |
| Ex. 6 | Resin material (6) | 4 | 1700 | 1.6 | 0.0062 | 98.5 | 0.51 | 5.1 | 1.25 | 99.9< |
| Ex. 7 | Resin material (7) | 6 | 1000 | 1.6 | 0.0091 | 98.5 | 0.43 | 5.3 | 1.53 | 99.2 |
| Ex. 8 | Resin material (8) | 10 | 400 | 1.6 | 0.0536 | 98.5 | 0.43 | 5.4 | 1.69 | 92.0 |
| Ex. 9 | Resin material (9) | 2 | 1700 | 1.6 | 0.0061 | 98.5 | 0.44 | 10.2 | 1.56 | 99.9< |
| Ex. 10 | Resin material (10) | 2 | 1700 | 1.6 | 0.0061 | 98.5 | 0.41 | 10.1 | 1.59 | 99.9< |
| Ex. 11 | Resin material (11) | 2 | 1700 | 1.1 | 0.0063 | 98.5 | 0.44 | 4.6 | 1.71 | 99.9< |
| Ex. 12 | Resin material (12) | 2 | 1700 | 2.1 | 0.0050 | 98.5 | 0.41 | 12.3 | 1.28 | 99.9< |
| Com. Ex. 1 | Resin material (13) | 2 | 1700 | 1.6 | 0.0061 | 72.0 | 0.12 | 6.4 | Insoluble | Insoluble |
| Com. Ex. 2 | Resin material (14) | — | 2100 | 1.6 | 0.0047 | 98.5 | 0.48 | 4.3 | Gelled | 99.9< |
| Com. Ex. 3 | Resin material (15) | 2 | 500 | 1.6 | 0.1803 | 99.3 | 0.81 | 4.3 | 4.40 | 99.9< |
| Com. Ex. 4 | Resin material (16) | 2 | 3100 | 1.6 | 0.0061 | 99.3 | 0.86 | 4.4 | Gelled | 85.5 |
| Com. Ex. 5 | Resin material (17) | 2 | 1700 | 1.6 | — | 99.5 | 1.29 | 16.3 | 2.01 | 99.9< |
| Com. Ex. 6 | Resin material (18) | 2 | 1700 | 1.6 | — | 98.5 | 0.42 | 5.1 | Gelled | 99.9< |
| Com. Ex. 7 | Resin material (19) | 2 | 1700 | 1.6 | 0.0061 | 99.8 | 2.80 | 14.1 | 1.85 | 99.9< |
| Com. Ex. 8 | Resin material (20) | 2 | 1700 | 1.6 | — | 98.5 | 0.42 | 13.7 | 1.30 | 99.9< |
| Com. Ex. 9 | Resin material (21) | 16 | 400 | 1.6 | 0.0139 | 99.6 | 1.22 | 11.2 | Insoluble | Insoluble |

*1Viscosity after 48-hour standing period at 5° C./viscosity immediately after start of standing period
*2Solubility of resin material for water after 5-hour stirring at 90° C. and 300 rpm In Comparative Example 1, the excessively low degree of saponification of the ethylene-modified PVA contained as the main component of resin material (13) made the resin material (13) insoluble in water, and it was not possible to evaluate solubility and aqueous-solution viscosity stability. In Comparative Example 2, resin material (14) gelled after a 48-hour standing period at 5° C. because of the absence of an ethylene unit in the ethylene-modified PVA contained as the main component of the resin material (14). Accordingly, the 10% aqueous solution had considerably low viscosity stability. In Comparative Example 3, the aqueous solution had low viscosity stability because of the excessively high content of the propyl group in the ethylene-modified PVA contained as the main component of the resin material (15). In Comparative Example 4, the ethylene-modified PVA as the main component of resin material (16) had an excessively high viscosity-average degree of polymerization, and the solubility was poor. The resin material (16) also gelled after a 48-hour standing period at 5° C., and the aqueous-solution viscosity stability was considerably low. In Comparative Example 5, the hue (YI) and aqueous-solution viscosity stability were poor because of the absence of a propyl group at one end of the ethylene-modified PVA contained as the main component of resin material (17). In Comparative Example 6, because the ethylene-modified PVA as the main component of resin material (18) had a dodecyl group, not a propyl group, at one end of the polymer, the resin material (18) gelled after a 48-hour standing period at 5° C., and the aqueous-solution viscosity stability was considerably low. In Comparative Example 7, the hue (YI) was poor because of the high sodium acetate content of resin material (19). In Comparative Example 8, the hue (YI) was poor because the ethylene-modified PVA as the main component of resin material (20) had a methyl group, not a propyl group, at one end of the polymer. In Comparative Example 9, because the ethylene-modified PVA as the main component of resin material (21) had an excessively high ethylene content, the resin material (21) was insoluble in water, and it was not possible to evaluate the resin material (21).

Production of Adhesive

Example 13

A powder of resin material (1) (32 parts) and an inorganic filler 1 (68 parts) were thoroughly dry blended, and added to water (331 parts, 20° C.) being stirred. Thereafter, 2,4-diphenyl-4-methyl-1-pentene (DPMP) was added to water as a compound having a conjugated double bond and a molecular weight of 1,000 or less. Here, the DPMP added had a concentration of 0.004 parts by mass relative to 100 parts by mass of resin material (1). The mixture was heated to 95° C., and the temperature was maintained for 2 hours to dissolve the resin material (1) and obtain an adhesive. The adhesive had a solid content of 23.2%, and a viscosity at 20° C. and 30 rpm of 1,210 mPa·s. The high-speed coatability of the adhesive was evaluated according to the method described above. The results are presented in Table 3.

Examples 14 to 16 and Comparative Examples 10 to 12

Adhesives were produced and evaluated in the same manner as in Example 13, except that the conditions shown in Table 3 were used with regard to the type of resin material, the type of inorganic filler, the type and content of the compound having a conjugated double bond and a molecular weight of 1,000 or less, and the solid content. The results are presented in Table 3.

TABLE 3

|  | Resin material | Inorganic filler[1] | Compound having conjugated double bond and molecular weight of 1,000 or less | | Solid content (%) |
|---|---|---|---|---|---|
|  |  |  | Type[2] | Content[3] (parts by mass) |  |
| Ex. 13 | Resin material (1) | 1 | DPMP | $40 \times 10^{-4}$ | 23.2 |
| Ex. 14 | Resin material (3) | 2 | SA | $1.8 \times 10^{-4}$ | 35.7 |
| Ex. 15 | Resin material (5) | 3 | SA | $1.8 \times 10^{-4}$ | 17.5 |
| Ex. 16 | Resin material (1) | 1 | — | — | 23.4 |
| Com. Ex. 10 | Resin material (14) | 1 | DPMP | $40 \times 10^{-4}$ | 20.0 |
| Com. Ex. 11 | Resin material (16) | 3 | SA | $1.8 \times 10^{-4}$ | 12.5 |
| Com. Ex. 12 | Resin material (18) | 1 | DPMP | $40 \times 10^{-4}$ | 23.5 |

|  | High-speed coatability | | | | |
|---|---|---|---|---|---|
|  | Viscosity (mPa · s) | Jumping | Roll transferability | Bubbling[4] | Stringiness |
| Ex. 13 | 1210 | A | A | 0.90 | A |
| Ex. 14 | 1240 | A | A | 0.88 | A |
| Ex. 15 | 1300 | A | A | 0.92 | A |
| Ex. 16 | 1150 | A | A | 0.88 | A |
| Com. Ex. 10 | 1210 | C | B | 0.84 | A |
| Com. Ex. 11 | 1230 | A | B | 0.87 | B |
| Com. Ex. 12 | 1370 | A | B | 0.77 | B |

[1] 1: Kaolinite clay (average particle diameter 0.4 μm), 2: Kaolinite clay (average particle diameter 0.6 μm), 3: heavy calcium carbonate (average particle diameter 1.75 μm)
[2] DPMP: 2,4-Diphenyl-4-methyl-1-pentene; SA: sorbic acid
[3] Content of compound having conjugated double bond and molecular weight of 1,000 or less relative to 100 parts by mass of resin material
[4] Mass of adhesive after rotation of rolls/mass of adhesive before rotation of rolls In Comparative Example 10, the absence of an ethylene unit in the ethylene-modified PVA contained as the main component of resin material (14) resulted in jumping of liquid droplets of adhesive from between the rolls. Transferability to the roll was non-uniform, and the adhesive solution had serious trapping of bubbles. Accordingly, high-speed coatability was unsatisfactory. In Comparative Example 11, the excessively high viscosity-average degree of polymerization of the ethylene-modified PVA contained as the main component of resin material (16) resulted in non-uniform transfer to the roll, and the adhesive had numerous strings. Accordingly, high-speed coatability was unsatisfactory. In Comparative Example 12, because the ethylene-modified PVA as the main component of resin material (18) had a dodecyl group, not a propyl group, at one end of the polymer, the resin material (18) failed to evenly transfer to the roll, and serious trapping of bubbles occurred in the adhesive solution, in addition to the adhesive having numerous strings. Accordingly, high-speed coatability was unsatisfactory.

As demonstrated in the Examples above, a resin material of the present invention excels in hue, water solubility, and aqueous-solution viscosity stability. This makes the present invention highly useful in industry.

The invention claimed is:

1. A resin material comprising an ethylene-modified vinyl alcohol polymer and sodium acetate, wherein:
   the ethylene-modified vinyl alcohol polymer has an ethylene unit content of 1 mol % or more and less than 15 mol %, a viscosity-average degree of polymerization of 400 or more and less than 3,000, and a degree of saponification of 80 mol % or more and less than 99.9 mol %, and comprises 0.0005 mol % or more and 0.10 mol % or less of a propyl group at one end of the polymer, and
   the sodium acetate content is 0.05 mass % or more and less than 2 mass %.

2. The resin material according to claim 1, wherein the resin material has a solubility of 90% or more after being stirred at 90° C. and 300 rpm for 5 hours with 90 parts by mass of water relative to 10 parts by mass of the resin material.

3. The resin material according to claim 1, wherein the ethylene-modified vinyl alcohol polymer has a 1,2-glycol linkage content of 1.2 mol % or more and less than 2.0 mol %.

4. The resin material according to claim 1, wherein the ethylene-modified vinyl alcohol polymer has an ethylene unit content of 1 mol % or more and less than 5 mol %.

5. The resin material according to claim 1, wherein the resin material further comprises a compound having a conjugated double bond and a molecular weight of 1,000 or less, the compound being contained in an amount of 0.000001 to 0.01 parts by mass relative to 100 parts by mass of the ethylene-modified vinyl alcohol polymer.

6. The resin material according to claim 5, wherein the compound having a conjugated double bond and a molecular weight of 1,000 or less comprises a compound having conjugated aliphatic double bonds, and/or a compound having an aliphatic double bond in conjugation with an aromatic ring.

7. The resin material according to claim 6, wherein the compound having a conjugated double bond and a molecular weight of 1,000 or less comprises a compound having conjugated aliphatic double bonds, and the compound having conjugated aliphatic double bonds is at least one selected from the group consisting of a conjugated diene compound, a conjugated triene compound, and a conjugated polyene compound.

8. The resin material according to claim 7, wherein the compound having conjugated aliphatic double bonds is a conjugated diene compound.

9. The resin material according to claim 5, wherein the compound having a conjugated double bond and a molecular weight of 1,000 or less comprises a compound having an aliphatic double bond in conjugation with an aromatic ring.

10. The resin material according to claim 5, wherein the compound having a conjugated double bond and a molecular weight of 1,000 or less has a molecular weight of 500 or less.

11. The resin material according to claim 1, wherein the ethylene-modified vinyl alcohol polymer comprises 0.001 mol % or more and less than 0.08 mol % of the propyl group at one end of the polymer.

12. The resin material according to claim 1, wherein the sodium acetate content is 0.1 mass % or more and less than 1.5 mass %.

13. A powder comprising the resin material of claim 1 and having a yellow index of 13.0 or less.

14. An aqueous solution comprising the resin material of claim 1.

15. An adhesive using the aqueous solution of claim 14.

16. The resin material according to claim 1, wherein the sodium acetate content is 0.67 mass % or more and less than 2 mass %.

17. The resin material according to claim 1, wherein the sodium acetate content is 1.70 mass % or more and less than 2 mass %.

18. The resin material according to claim 1, wherein the resin material has a hue (YI) of from 4.6 to 12.3, a water solubility of greater than or equal to 99.9%, and an aqueous-solution viscosity stability of from 1.01 to 1.71, in which the aqueous-solution viscosity stability is a viscosity after a standing period of 48 hours at 5° C. of a 10% aqueous solution of the resin material divided by a viscosity at 0 hours of the standing period of the 10% aqueous solution of the resin material.

19. The resin material of claim 1, wherein the ethylene-modified vinyl alcohol polymer comprises 0.005 mol % or more and less than 0.10 mol % of the propyl group at one end of the polymer.

20. A method of producing a resin material comprising an ethylene-modified vinyl alcohol polymer and sodium acetate, the method comprising:
reacting ethylene and vinyl acetate in the presence of a propyl group-containing initiator and a propyl group-containing chain transfer agent, thereby providing an ethylene-modified vinyl ester polymer,
wherein:
the ethylene-modified vinyl alcohol polymer in the resin material has an ethylene unit content of 1 mol % or more and less than 15 mol %, a viscosity-average degree of polymerization of 200 or more and less than 3,000, and a degree of saponification of 80 mol % or more and less than 99.9 mol %, and comprises 0.0005 mol % or more and 0.10 mol % or less of a propyl group at one end of the polymer, and
the sodium acetate content in the resin material is 0.05 mass % or more and less than 2 mass %.

* * * * *